US010380917B2

(12) United States Patent
Lee

(10) Patent No.: US 10,380,917 B2
(45) Date of Patent: *Aug. 13, 2019

(54) FLEXIBLE DENTAL MODEL

(71) Applicant: Sue S. Lee, Framingham, MA (US)

(72) Inventor: Sue S. Lee, Framingham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/783,098

(22) Filed: Oct. 13, 2017

(65) Prior Publication Data

US 2018/0040260 A1 Feb. 8, 2018

Related U.S. Application Data

(63) Continuation of application No. 14/790,705, filed on Jul. 2, 2015, now Pat. No. 9,812,036.

(51) Int. Cl.
*G09B 23/28* (2006.01)
*G09B 23/32* (2006.01)

(52) U.S. Cl.
CPC ........... *G09B 23/283* (2013.01); *G09B 23/32* (2013.01)

(58) Field of Classification Search
USPC ........... 434/262, 263, 267; 433/34, 213, 214
See application file for complete search history.

(56) References Cited

U.S. PATENT DOCUMENTS

| 1,654,387 | A | 12/1927 | Stenz |
| 4,583,947 | A | 4/1986 | Hazar |
| 5,232,370 | A * | 8/1993 | Hoye .................. G09B 23/283 434/263 |
| 5,788,489 | A | 8/1998 | Huffman |
| 7,037,111 | B2 * | 5/2006 | Miller .................... A61C 7/00 433/213 |
| 7,544,061 | B2 | 6/2009 | Poitras |
| 8,303,302 | B2 | 11/2012 | Teasdale |
| 8,506,297 | B2 | 8/2013 | Klare et al. |
| 8,801,437 | B2 | 8/2014 | Mousques |
| 9,092,997 | B2 | 7/2015 | Baekgaard et al. |
| 2009/0233255 | A1 | 9/2009 | De Souza Fonseca Silva et al. |
| 2012/0122065 | A1 | 5/2012 | Snoad |

(Continued)

FOREIGN PATENT DOCUMENTS

| CN | 1352443 A | 6/2002 |
| JP | 2008310276 A | 12/2008 |

(Continued)

*Primary Examiner* — Kurt Fernstrom
(74) *Attorney, Agent, or Firm* — Mintz Levin Cohn Ferris Glovsky and Popeo, P.C.; Kongsik Kim; Derek E. Constantine

(57) ABSTRACT

A dental model is provided including at least one artificial flexible jaw including an arch-shaped base portion having outer and inner walls extending between first and second ends, the base portion holding a plurality of teeth. The base portion is flexible and extendable so that its first and second ends can move in three dimensions with respect to each other. Thus, the base portion can move to various configurations in which the first and second ends can be positioned in any manner with respect to each other, e.g., at different distances from each other and/or in different planes. The dental model can include one or both of hard palate and soft palate with or without uvula configured to deform when the base portion is deformed. The one or more jaws can be mounted on a holder.

19 Claims, 12 Drawing Sheets

(56) References Cited

U.S. PATENT DOCUMENTS

2014/0045160 A1    2/2014   Higashimura et al.
2015/0282913 A1   10/2015   Zegarelli

FOREIGN PATENT DOCUMENTS

| JP | 2012196454 A | 10/2012 |
| KR | 200422578 Y1 | 7/2006 |
| KR | 10-2012-0003581 | 1/2012 |
| KR | 20120003581 A | 1/2012 |
| KR | 10-2012-0129157 | 4/2013 |

\* cited by examiner

FLEXIBLE DENTAL MODEL

CROSS-REFERENCE TO RELATED APPLICATION

This application is a continuation of U.S. application Ser. No. 14/790,705 filed on Jul. 2, 2015, which is incorporated herein by reference.

TECHNICAL FIELD

The present disclosure relates to a dental model used for demonstration of a teeth position and its relation to a dental arch configuration, and particularly to a dental model including an extendable and flexible jaw.

BACKGROUND

Dental models are widely used for teachings purposes and patient education. For example, dental models can be used to demonstrate various teeth conditions to a patient and can be used to educate the patient about a proper dental morphology and care. Also, for orthodontic evaluations in adults and children, dental models can be used to demonstrate alignment and occlusion. Dental models are also commonly used for visualizing the dental alignment and occlusion for education and training of dentists and dental students.

Although multiple dental models have been developed, existing models have certain drawbacks. For example, conventional dental models can be developed to represent only an external aspect of the teeth position and bite. Furthermore, conventional dental models may not have sufficient flexibility, which can impede proper to patients of teeth conditions and projected improvements. Accordingly, there is a need for improved dental models.

SUMMARY

Methods and devices are provided for a dental model having one or both dental bones flexible and extendable. A dental model can have at least one artificial jaw including a plurality of teeth and a base portion holding the plurality of teeth. The base portion can have opposite first and second ends configured to move relative to each other in three dimensions. Outer and inner walls of the base portion extending between the first and second ends represent an arch-shaped outer surface of a dental arch and an internal wall that contours the dental arrangement in the jaw. Changes in the dental arch configuration can demonstrate changes in teeth position, as well as in hard and soft palate.

In one aspect, a dental model is provided including at least one artificial jaw. The least one artificial jaw includes a plurality of teeth, and a base portion retaining the plurality of teeth, the base portion having opposite first and second ends configured to move relative to each other in three dimensions, wherein inner and outer walls of the base portion extending between the first and second ends are arch-shaped, and wherein a contour of the inner wall follows an internal arch pattern and a contour of the outer wall follows an outline of the plurality of teeth.

The dental model can vary in a number of ways. For example, the plurality of teeth and the base portion can form a dental arch. The plurality of teeth can represent natural teeth of a subject.

In some aspects, in a first configuration of the base portion, the first and second ends are disposed in the same plane, and the base portion is configured to move from the first configuration to the second configuration in which the first and second ends are disposed in different planes. In the second configuration, a plane extending through the first end can be disposed at an angle greater than about 5 degrees relative to a plane extending through the second end.

In some aspects, in a first configuration of the base portion, the outer and inner walls are arch-shaped, and the base portion is configured to move from the first configuration to a second configuration in which the inner and outer walls extend substantially along a same axis extending therethrough, the axis extending between the first and second ends.

The base portion can vary in a number of ways. For example, at least one of the base portion and the plurality of teeth can be formed from an elastic and flexible material. The base portion can be at least partially transparent. One or more of the plurality of teeth can be removable from the base portion. The dental model can be configured to demonstrate crowding of the remaining teeth when one or more teeth are removed. In some variations of the described subject matter, one or more of segments of the base portion each including a portion of the base portion and at least one tooth of the plurality of teeth supported by the portion can be removable from the base portion.

The at least one jaw can be an upper jaw or a lower jaw, or it can include both the upper and lower jaws. In some aspects, the dental model can further include a hard palate configured such that a deformation of the base portion causes the hard palate to deform. In some aspects, the dental model can further include a soft palate configured such that a deformation of the base portion causes the soft palate to deform and to change a pharyngeal spatial configuration.

In some variations of the described subject matter, the dental model can further include a holder having an elongate shaft and first and second extendable arms hingeably coupled thereto, wherein the at least one artificial jaw can be mounted on the holder via the first extendable arm coupled to the first end of the base portion and the second extendable arm coupled to the second end of the base portion. The first and second extendable arms can be hingeably coupled to different locations along a longitudinal axis of the elongate shaft.

In some variations of the described subject matter, the dental model can further include a holder having first and second elongate shafts each having first and second extendable arms hingeably coupled thereto, wherein the at least one artificial jaw can include an upper jaw and a lower jaw, and wherein the upper and lower jaws can each be mounted on the holder via the first extendable arms coupled to first and second ends, respectively, of the upper jaw and the second extendable arms coupled to first and second ends, respectively, of the lower jaw.

In some aspects, a method of using a dental model can be provided. The method can include deforming a dental model representing a dental arch including a plurality of teeth and a base portion holding the plurality of teeth, the base portion having opposite first and second ends configured to move relative to each other in three dimensions, wherein inner and outer walls of the base portion extending between the first and second ends are arch-shaped, and wherein a contour of the inner wall follows an internal arch pattern and a contour of the outer wall follows an outline of the plurality of teeth.

The method can vary in a number of ways. For example, the dental model can further include at least one of hard and soft palates, and the method can include deforming the dental model such that a deformation of the base portion causes at least one of the hard and soft palates to move into a deformed configuration. In the deformed configuration, the hard palate can deform in a first direction and the soft palate can extend in a second, opposite direction.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION OF THE INVENTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Various exemplary methods and devices are provided that allow manipulating a dental model so that first and second ends of one or both upper and lower jaws of the model can be moved in three dimensions with respect to each other. The jaw of the dental model includes a base portion supporting a plurality of teeth representing human dentition. The dental model can be created by making an impression of patient's teeth so that the patient can view a resulting realistic representation of his or her teeth and can be explained a dental procedure (e.g., orthodontic correction) to be performed. The teeth for the dental model can be manufactured in any suitable manner. The artificial jaw having first and second opposed ends can be extendable such that it can move from a first arcuate configuration (that mimics natural jaw) to a "panoramic" configuration such that it becomes generally flattened and a longitudinal extending along the jaw passes through both the first and second ends. The artificial jaw can also be folded anteriorly or posteriorly, and/or deformed in any other manner. The folding can demonstrate the effects of normal and deformed internal configurations on the external arch form, and the teeth in the artificial jaw can be moveable within the supporting base portion between a normal, undeformed position and positions deviating from normal positions. This can facilitate demonstration to the patient of improvements to be performed on his or her teeth. Thus, the dental model can demonstrate orthodontic tooth movement by changing the arch configuration.

In some embodiments, a support holder is provided that can be configured to have one or more artificial jaws mounted thereon. The holder can be configured such that the jaws can be movably mounted thereon so that the configuration of an internal arch can be changed while the jaws remain associated with the holder. Also, the jaws can be removably coupled to the holder so that they can be separated therefrom. Also, the jaws can be constructed as the integral component of an entire skull structure.

Figure 1:
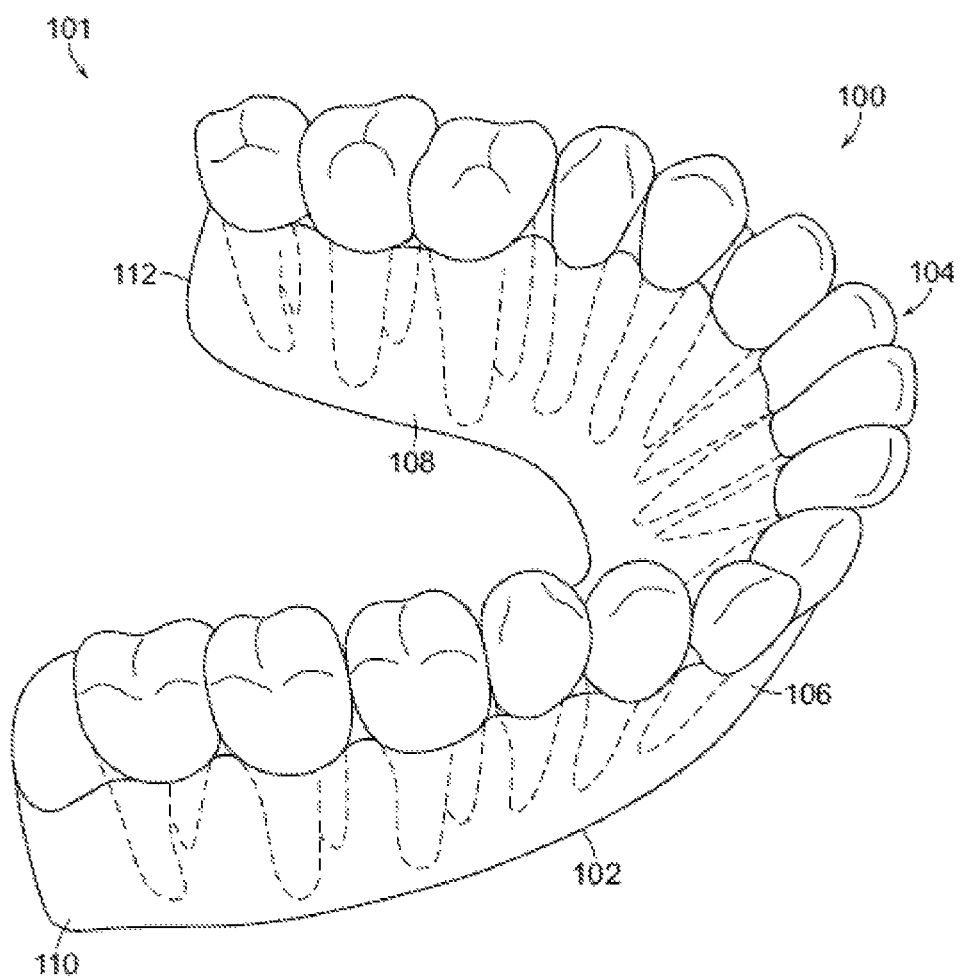
FIG. 1 is a perspective view of one embodiment of an artificial jaw in an original configuration.

FIG. 1 illustrates one embodiment of an artificial jaw 100 of a dental model 101. In this example, the artificial jaw 100 can include a base portion 102 and a plurality of teeth 104 mounted within the base portion 102. In the illustrated embodiment, the jaw 100 is in the form of an upper jaw, and the teeth 104 are maxillary teeth. As shown, the artificial jaw 100 can be a realistic model of a human dental arch. However, it should be appreciated that the artificial jaw can differ from a realistic representation of a human dental arch in a number of different ways.

The base portion 102 can have an outer wall 106 and an inner wall 108 extending between first and second ends or end portions 110, 112 of the base portion 102. The outer wall 106 extends along the front of the teeth 104 and an inner wall 108 extends along the back of the teeth 104. The front and back of the teeth 104 represent front and back of the alveolar bone harboring natural teeth, respectively.

A mentioned above, in the illustrated embodiment, the artificial jaw 100 includes a dental arch of the upper jaw. As used herein, a dental arch is generally defined as a perimeter of an arch mesial to the permanent molars. Thus, the artificial jaw 100 is generally arch-shaped. A representation of other areas of the mouth, such as hard palate (base of nasal cavity), soft palate, and the area under the tongue, are not included in the artificial jaw 100. However, it should be appreciated that one or more portions representing other areas of the mouth can be included in the dental model, as discussed below.

The base portion 102 can have a variety of configurations, shapes, and sizes. The labial view of base portion 102 can be generally arch-shaped externally to resemble a semi-circular outline of a natural human jaw with teeth alignment. The plurality of teeth 104 can be positioned within the base portion 102 to represent natural teeth in a jaw bone. The base portion 102 also represents the alveolar bone covered with gingival tissue surrounding the teeth. As mentioned above, in some embodiments, the artificial jaw 100 does not include a dental arch so that the teeth can be placed separately and the contour of the outer wall 106 follows closely the inner wall 108. A distance between the inner wall 108 and the outer wall 106, which defines a width of the base portion 102, is sufficient to hold the teeth 104.

The base portion 102 can have any suitable size. When the artificial jaw 100 is created based on an impression of patient's teeth, a size of the base portion 102, measured along a curvature thereof between the first and second ends 110, 112, can depend on a size of the patient's jaw and dental alignment. Furthermore, in embodiments in which the artificial jaw 100 does not represent a jaw of a particular person (e.g., when it represents a jaw in a certain developmental dental stage and manufactured teeth for educational or other purposes), the jaw 100 can have any suitable size. In general, in dental models not created based on particular person's teeth, the base portion 102 can have any suitable length, which can be close a length of a natural dental arch bone of jaw or it can have a size different from that of a natural arch size of jaw.

The base portion 102 can be made from any suitable material. In some embodiments, the base portion 102 can be formed from an elastic and resilient material. The material can be, for example, natural or synthetic rubber or any other suitable polymer. As illustrated in the exemplary embodiment of FIG. 1 showing roots of the teeth visible, the material can be at least partially transparent. In some cases, the material can be entirely transparent. Additionally or alternatively, the base portion 102 can be manufactured such that one or more of its portions are transparent whereas other portions are opaque or substantially opaque. For example, portions of the base portion 102 below each tooth that have a root of that tooth embedded therein can be formed partially transparent such that the root can be visible. Furthermore, in some embodiments, the base portion can be formed from a shape memory material such that, if the base portion 102 is deformed in any manner, it can return to its pre-deformed shape. Any segment of the base portion can be reversibly deformed (e.g., bent or indented inward and/or outward) and it can remain in such configuration until the base portion is manipulated to revert it to the original shape (or to deform it in any other manner). The base portion 102 can be manufactured in any suitable manner, using any suitable techniques as known in the art.

Figure 2:
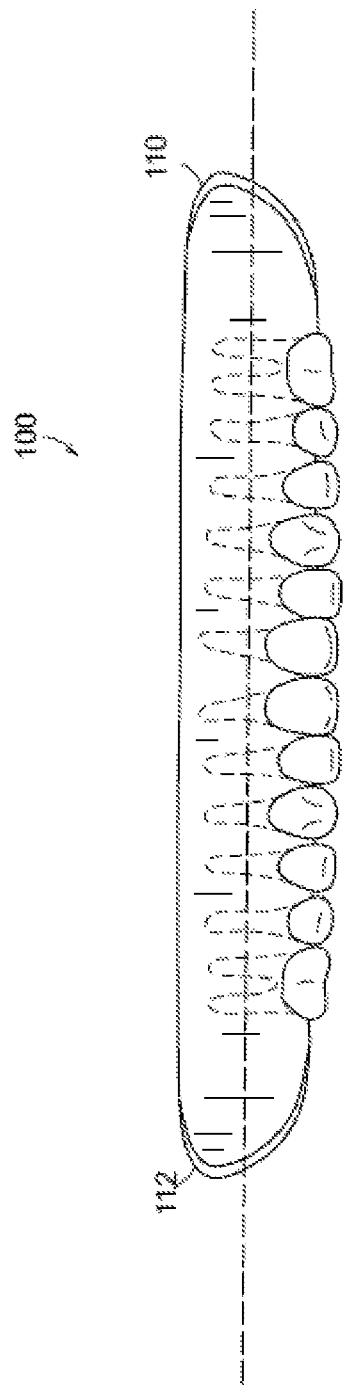
FIG. 2 is a perspective view of the artificial jaw of FIG. 1 in a deformed configuration.

In the illustrated embodiments, because of the shape of the base portion 102 and an elastic material forming it, the base portion 102 can be flexible such that it can be deformed in any suitable manner, to demonstrate various aspects of teeth and/or the entire dental arch. Thus, the first and second ends 110, 112 of the base portion 112 can be manipulated in three dimensions to be positioned in any manner with respect to each other. For example, in FIG. 1, the base portion 102 is shown in a first, original configuration in which the base portion 102 has not been manipulated, or deformed. The base portion 102 can be moved from the first, original configuration to a second, deformed configuration in which the outer and inner walls 106, 108 extend substantially along a same longitudinal axis A extending therethrough, which extends between the first and second ends 110, 112, as shown in FIG. 2. The deformed configuration shows a primary alignment of the base portion which demonstrates the natural horizontal arch curve.

As shown in FIG. 2, the configuration and flexibility of the base portion 102 allow the artificial jaw 100 to be moved from an arch-shaped configuration into a substantially straight configuration. It should be appreciated, however, that the outer and inner walls 106, 108 are shaped so that their surfaces are not entirely planar. Thus, when the base portion 102 is expanded such that it is substantially straightened, as shown in FIG. 2, the outer and inner walls 106, 108 have various surface features and contours intended to make the artificial jaw 100 to resemble a natural jaw.

Figure 3A:
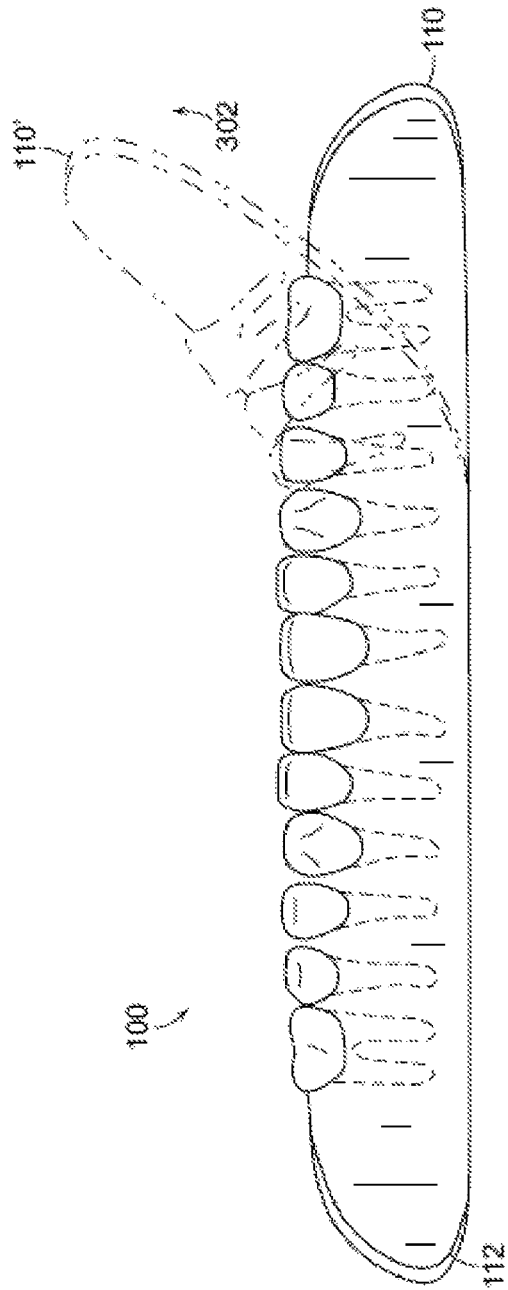
FIG. 3A is another perspective view of the artificial jaw of FIG. 1 in a deformed configuration.
Figure 3B:
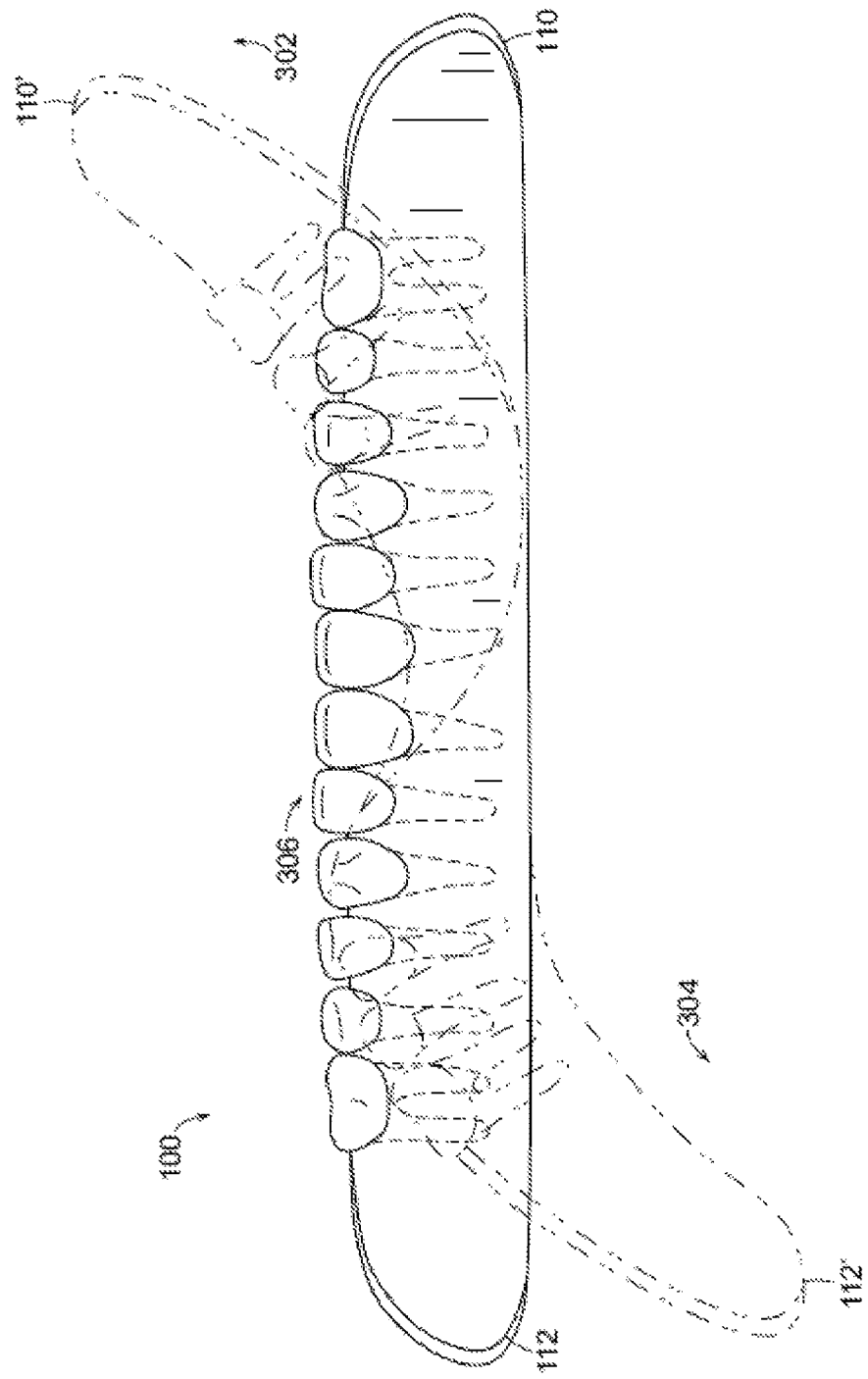
FIG. 3B is yet another perspective view of the artificial jaw of FIG. 1 in a deformed configuration.

One skilled in the art will appreciate that the base portion 102 can deformed in any manner (e.g., folded, extended, squeezed, etc.), such that the first and second ends 110, 112 and opposite arcuate sides of the base portion 102 can be disposed in a variety of different ways with respect to one another. For example, as schematically shown in FIGS. 3A and 3B, one or both of the first and second ends 110, 112 and the sides of the base portion 102 can be bent and/or twisted. Thus, FIG. 3A illustrates that the first end 110 can be bent and twisted upward (as shown by an arrow 302) to a position 110'. FIG. 3B further illustrates that the first end 110 can be bent and twisted upward to the position 110', whereas the second end 112 can be bent and twisted downward (as shown by an arrow 304) to a position 112' such that a mid-portion of the base portion 102 can be bent and twisted, as shown by an arrow 306. A person skilled in the art will appreciate that the base portion 102 is configured such that any of its portions can be bent, twisted, or otherwise deformed the arch configuration in any suitable manner. For example, the base portion 102 can be deformed at its mid-portion such that the entire side (e.g., the left side) is deformed in one way (e.g., bent in a first direction) and the opposite side (e.g., the right side) is deformed in another way (e.g., bent in an opposite, second direction). One or more of any other portions of the base portions 102 can additionally or alternatively be deformed such that the arch configuration is deformed. The base portion 102 can be deformed such that its ends are brought closer together or away from each other.

The artificial jaw 100 can adopt a variety of configurations while being held and caused to move (e.g., bended, flexed, extended, indented etc.) into a particular configuration and tooth position. The flexibility of the base portion 102 can be soft such that the changed tooth position is held and/or resilient so that, once modifying forces are no longer applied thereto, it can return to its original configuration, shown, for example, in FIG. 1. However, in some embodiments, as mentioned above, the artificial jaw 100 can be created so that it can maintain (permanently or temporary) a second configuration without application of external forces.

To adopt different shapes, the artificial jaw 100 can be manipulated manually or using a suitable tool(s). For example, a dentist or a patient can flex the artificial jaw 100 for patient demonstration purposes. As another example, the first and second ends 110, 112 can each be coupled to an attachment member (e.g., clasp, clip, clamp, etc.) that can be configured to be removably attached to a suitable instrument that can be used to expand, fold, constrict, and otherwise manipulate the artificial jaw. In some embodiments, the artificial jaw 100 can be mounted on an articulator that can be used to hold and manipulate the jaw, as discussed in more detail below.

An artificial jaw of a dental model in accordance with the described techniques, such as the artificial jaws 100, can be advantageously used to demonstrate to patients or dental students different malocclusions. The dental model can be created so as to simulate a natural arch form of a jaw with teeth and it can be used to demonstrate how shaping the internal arch pattern can be used to outline an arch form and demonstrate shifting of one or more teeth to treat an orthodontic or other problem in a patient. Furthermore, because the positions of the ends and other portions of the base portion of the model's jaw can be manipulated in three dimensions, the artificial jaw can be used to additionally demonstrate the cause and effect of different arch form deformities on misalignment and malocclusion of teeth in three dimensions. For example, the artificial jaw can demonstrate V-shaped, constricted, broad, and any arch configurations which can affect teeth positions accordingly, demonstrating crossbite, underbite, overbite, overjet, deepbite, openbite and any other orthodontic problems. The arch form deformities of jaw can deter the morphology of peripheral structures (e.g., palate, nasal cavity, soft palate, etc.), and some embodiments can demonstrate subsequent deformities of such peripheral structures as the components of facial and cranium structures.

In some embodiments, one or more of a plurality of teeth held in a base portion of an artificial jaw (e.g., artificial jaw 100 in FIG. 1) can be moveable within the base portion. This can be advantageously used to demonstrate projected orthodontic teeth movement using a single dental model. For example, the teeth can be moveable so that one or more teeth shown to be incorrectly positioned in the jaw can be moved to show to a patient how this problem can be treated and how the teeth will look when positioned correctly. Any teeth malpositions and their potential corrections can be modeled and demonstrated in this manner. In this way, a patient can be better educated as to his or her dental condition, a planned treatment, and an outcome of the treatment.

Figure 4A:
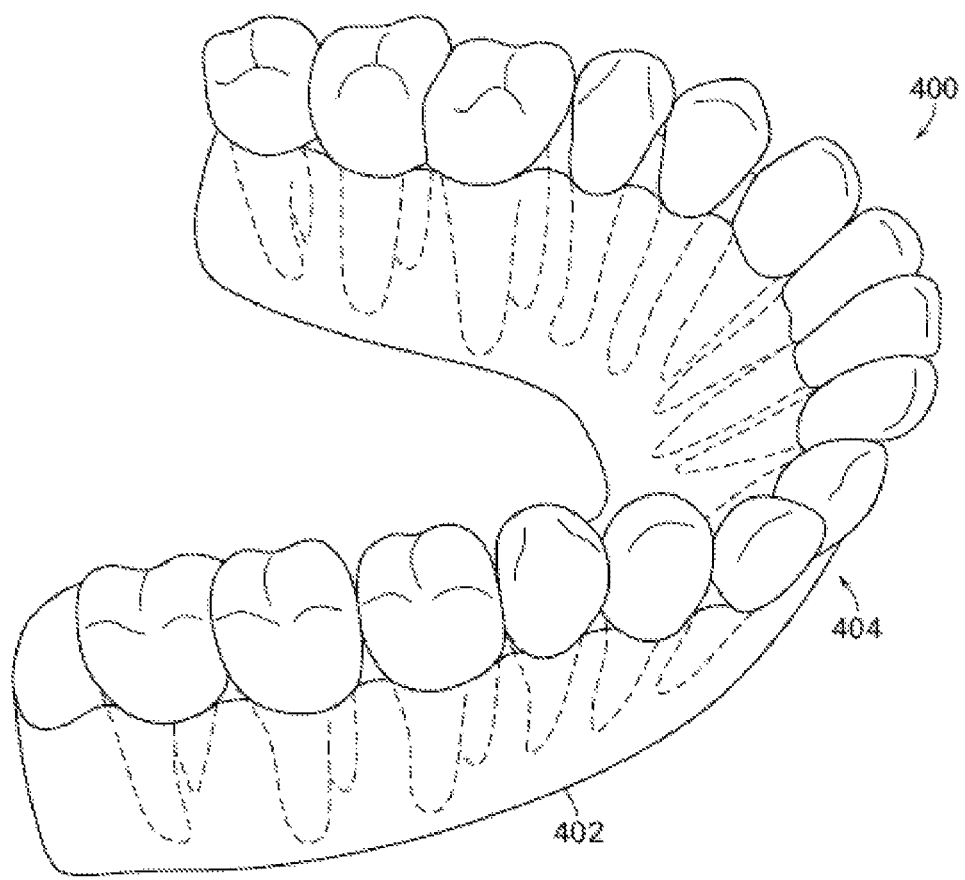
FIG. 4A is a perspective view of one embodiment of an artificial jaw with no teeth removed and crowding from a base portion of the jaw.
Figure 4B:
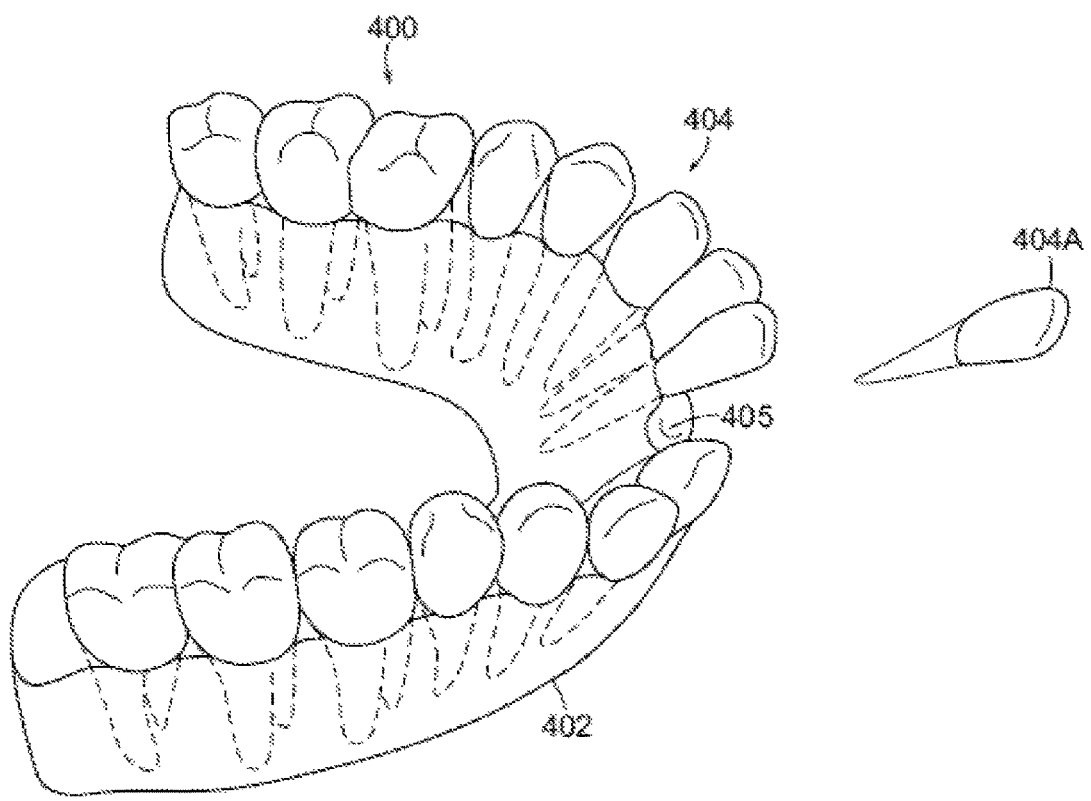
FIG. 4B is a perspective view the artificial jaw of FIG. 4A showing a tooth removed from the base portion.

FIGS. 4A and 4B illustrate one embodiment of an artificial jaw 400 having a base portion 402 and teeth 404 where one or more of the teeth 404 can be removable from their retaining cavities simulating alveolar cavities in the jaw bone. Thus, in FIG. 4B, a tooth 404A is shown removed from its cavity 405 in the base portion 402. In some embodiments, the artificial jaw 400 can be configured such that a segment of the base portion 402 carrying the tooth 404A can be removed from the base portion 402. The base portion 402 can include one or more of such removable segments, each segment including a portion of the base portion 402 and one or more of the teeth 404.

One or more of the teeth 404 can be removably retained within the base portion 402 using a number of suitable techniques. For example, the teeth 404 can be held within their cavities using pins, screws, magnets, detents, threads or any other retaining features. Furthermore, one or more teeth can be fittedly inserted into respective cavities in the base portion 402 without using any specific retaining features.

It should be appreciated that a dental model in accordance with the described techniques can be configured to demonstrate a variety of other conditions. For example, an artificial jaw model can demonstrate tipping of teeth into an extraction site and a corresponding arch deformation. As another example, an artificial jaw model can also demonstrate crowded teeth and a corresponding arch deformation. Various other teeth deformities and arch configurations can also be demonstrated.

The plurality of teeth in a dental model in accordance with the described techniques can be made moveable in any suitable manner. In some embodiments, one of more of the plurality of teeth can be mounted within a jaw formed from an elastic material, such as a resiliently elastic material (e.g., natural or synthetic rubber or any other suitable polymer). The resiliency of the material can be selected to allow the teeth to be moved in a desired position and remain in that position for a certain amount of time before they return into their original shape. However, as one of skill in the art will appreciate, the plurality of teeth can be moveable in any other manner. In some embodiments, one or more of the plurality of teeth can be moved in a desired position and remain in that position until they are moved back by a user.

Teeth mounted within an artificial jaw as described herein can be created to represent various teeth conditions such that, by removing a tooth from the base of the jaw simulating a jaw bone and surrounding gums, and how the arch configuration changes, a patient can view the effects of the missing tooth. Also, the patient can view the tooth's root and crown in an improved manner, as compared to when the tooth is seated within the base portion. Additionally or alternatively, as mentioned above, in some embodiments, one or more of the segments of the plurality of teeth in a jaw of a dental model can be removable from the jaw. The teeth in anterior and/or posterior segments (e.g., a portion of the jaw including one or more teeth mounted therein) can be removed and/or manipulated to demonstrate components of the dental arch. In some embodiments, one or more of the segments and/or the teeth in each segment can be removable from the jaw. Removing and manipulating the teeth and the arch segments can demonstrate, for example, the effect of arch proportion on the teeth alignment.

In some embodiments, at least one of upper and lower artificial jaws in accordance with the described techniques can be mounted on a holder configured to hold the upper and lower jaws and that allows respective movement of the jaws and movements of each of the jaws' ends each respect to each other. The holder allows conveniently demonstrating both upper and lower jaws simultaneously, which can be useful for various education and teaching purposes.

Figure 5:
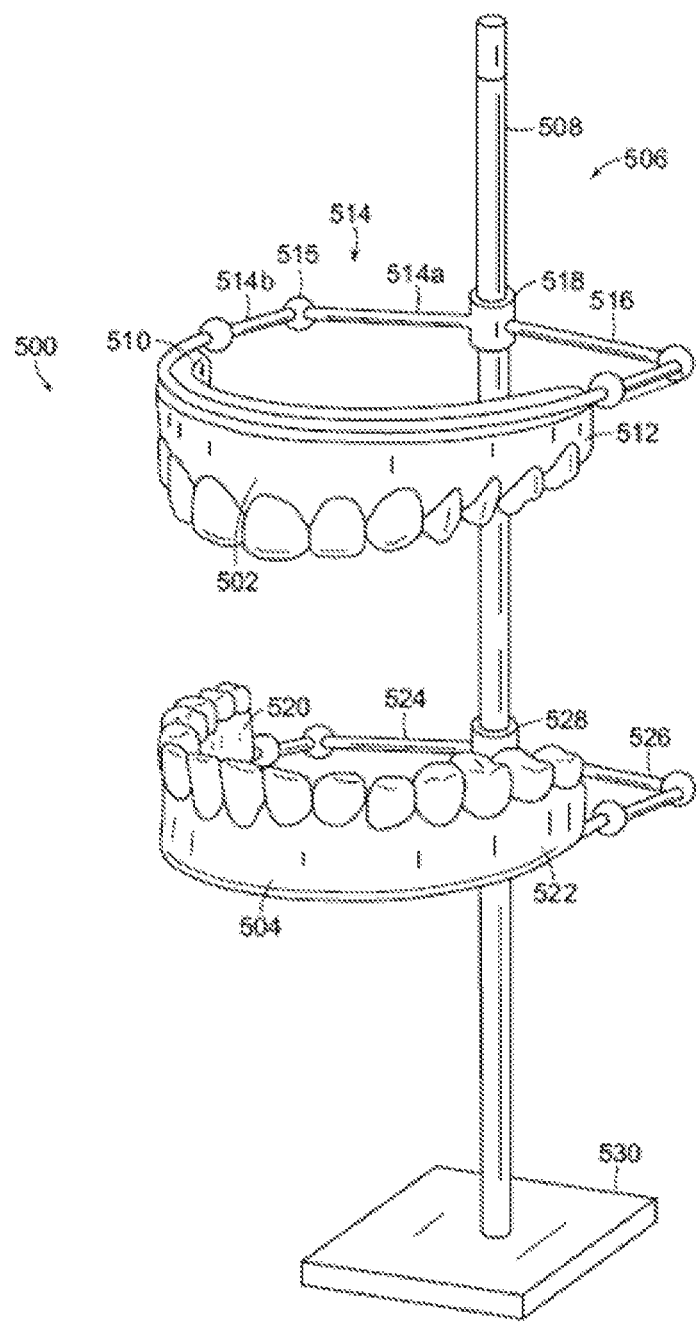
FIG. 5 is a schematic representation of one embodiment of a holder having a dental model mounted thereon.

FIG. 5 illustrates an example of a dental model 500 including an upper jaw 502 having first and second ends or end portions 510, 512, and a lower jaw 504 having first and second ends or end portions 520, 522. The upper and lower jaws 502, 504 can represent a natural dentition of a patient. In the illustrated embodiment, the upper and lower jaws 502, 504 are mounted on a holder 506 to resemble a relationship between natural upper and lower jaws of a human. The holder 506 can be configured to have the upper and lower jaws 502, 504 mounted thereon under an angle so as to resemble more closely natural upper and lower jaws, or in any other manner.

The holder 506 can have any suitable configuration. In the illustrated embodiment, as shown in FIG. 5, the holder 506 has an elongate shaft 508 and first and second extendable arms 514, 516 and 524, 526 hingeably coupled thereto via coupling members 518, 528, respectively. The holder 506 also can include a stand 530 having the shaft 508 mounted thereon, which can have any suitable configuration.

As shown, the first and second extendable arms 514, 516 are coupled to the shaft 508 via the coupling member 518, and the first and second extendable arms 524, 526 are coupled to the shaft 508 via the coupling member 528. The arms 514, 516 and 524, 526 can be coupled to the shaft 508 so that they can move in three dimensions. The arms can be coupled to the shaft 508 via a suitable connection, such as, for example, a ball-and-socket connection. However, any other type of connection can be used, as embodiments are not limited in this respect.

The positions of the coupling members 518, 528 along the shaft 508 can be adjustable. Thus, the upper and lower jaws 502, 504 can be moved close to one another and away from one another, as desired. Furthermore, one or both of the coupling members 518, 528 can be configured such that the upper and lower jaws 502, 504 can be positioned under various angles with respect to each other. However, in some embodiments, the engaging members 518, 528 can be fixedly attached to the shaft 508 so as to maintain a certain relationship between the upper and lower jaws 502, 504, for example, a relationship that models a relationship between respective natural jaws.

The first extendable arms 514, 516 and second extendable arms 524, 526 can have any suitable configuration, including the same or different configurations. For example, one or more of the first and second extendable arms 514, 516 and 524, 526 can include two or more hingeably interconnected joints so that the arms can extend and retract to thereby change a configuration of the jaw attached thereto. For example, as shown in FIG. 5, the first extendable arm 514 can include a first arm section 514a coupled to the coupling member 518 and a second arm section 514b coupled to the first arm section 514a via a joint 515. It should be appreciated, however, that the first extendable arm 514 can include more than two joints. Furthermore, in some embodiments, the first extendable arm 514 can have a single joint. The arms 516, 524, 526 can be configured similarly. Additionally or alternatively, one or more of the first and second extendable arms 514, 516 and 524, 526 can include springs or any other elements that allow the arms to extend and retract, and move in other ways.

As shown in FIG. 5, the first extendable arms 514, 516 are configured to couple the upper jaw 502 having first and second ends 510, 512 to the shaft 508. Similarly, the first and second extendable arms 524, 526 are configured to couple the lower jaw 504 having first and second ends 520, 522 to the shaft 508. The upper and lower jaws 502, 504 can be removably coupled to the extendable arms via a number of suitable mechanisms. For example, in the illustrated embodiment, as shown in FIG. 5, the first extendable arms 514, 516 can be coupled to an arcuate jaw holder 532 extending therebetween and configured to retain the upper jaw 502 in a suitable manner. For example, the upper jaw 502 can include a groove configured such that the upper jaw 502 can be seated on the jaw holder 532. Furthermore, the jaw holder 532 can include retaining feature(s), such as clips, margents, clamps, etc., (not shown) configured to retain the upper jaw 502. The jaw holder 532 can be flexible or bendable so as to allow the upper jaw 502 to be deformed in a desirable manner.

The jaw holder 532 can be configured to permanently or removably hold the upper jaw 502. When the upper jaw 502 is removable, once removed, it can be manually manipulated in any manner, for example, as disused above for jaw 100 in connection with FIGS. 1, 2, 3A, and 3B. In other words, the upper jaw 502 can be manipulated (e.g., bent and/or twisted anteriorly or posteriorly) while it is being mounted on the holder or when it is removed from the holder.

The lower jaw 504 can be mounted on the holder 506 similarly to the upper jaw 502, and various ways of mounting the lower jaw 504 are therefore not described in detail herein.

In some embodiments, the extendable arms can be coupled to or integrally formed with a clip or other retaining mechanism configured to support the upper jaw 502 mounted on the holder 506. For example, each of the first and second ends 510, 512 of the upper jaw 502 and the first and second ends 520, 522 of the lower jaw 504 can have an engaging member configured to engage a corresponding engaging member of the respective arm connecting that end to the shaft 508. For example, in one embodiment, each of the first and second ends 510, 512 of the upper jaw 502 and the first and second ends 520, 522 of the lower jaw 504 can have a clip, clasp, clamp, or any other engaging component attached thereto that can be removably attached to the first and second extendable arms 514, 516 and 524, 526. Also, the arms can have engaging members configured to snap on, clasp, clamp, or otherwise engage with the jaws. As one of skill in the art will understand, any other engaging mechanisms can be used additionally or alternatively.

The first and second extendable arms 514, 516 can be manipulated so that the first and second ends 510, 512 of the upper jaw 502 can be positioned in any manner with respect to each other. Similarly, the first and second extendable arms 524, 526 can be manipulated so that the first and second ends 520, 522 of the lower jaw 504 can be moved in any suitable way, depending on a purpose of creating and manipulating the jaw. In this way, each of the upper and lower jaws 502, 504 can be manipulated to move from an original configuration (e.g., as shown for jaw 100 in FIG. 1) to various other configurations (e.g., as shown for jaw 100 in FIGS. 2, 3A, and 3B). However, it should be appreciated that the holder 506 can be configured so that the upper and lower jaws 502, 504 are held thereon and can be manipulated in any suitable manner.

Figure 6:
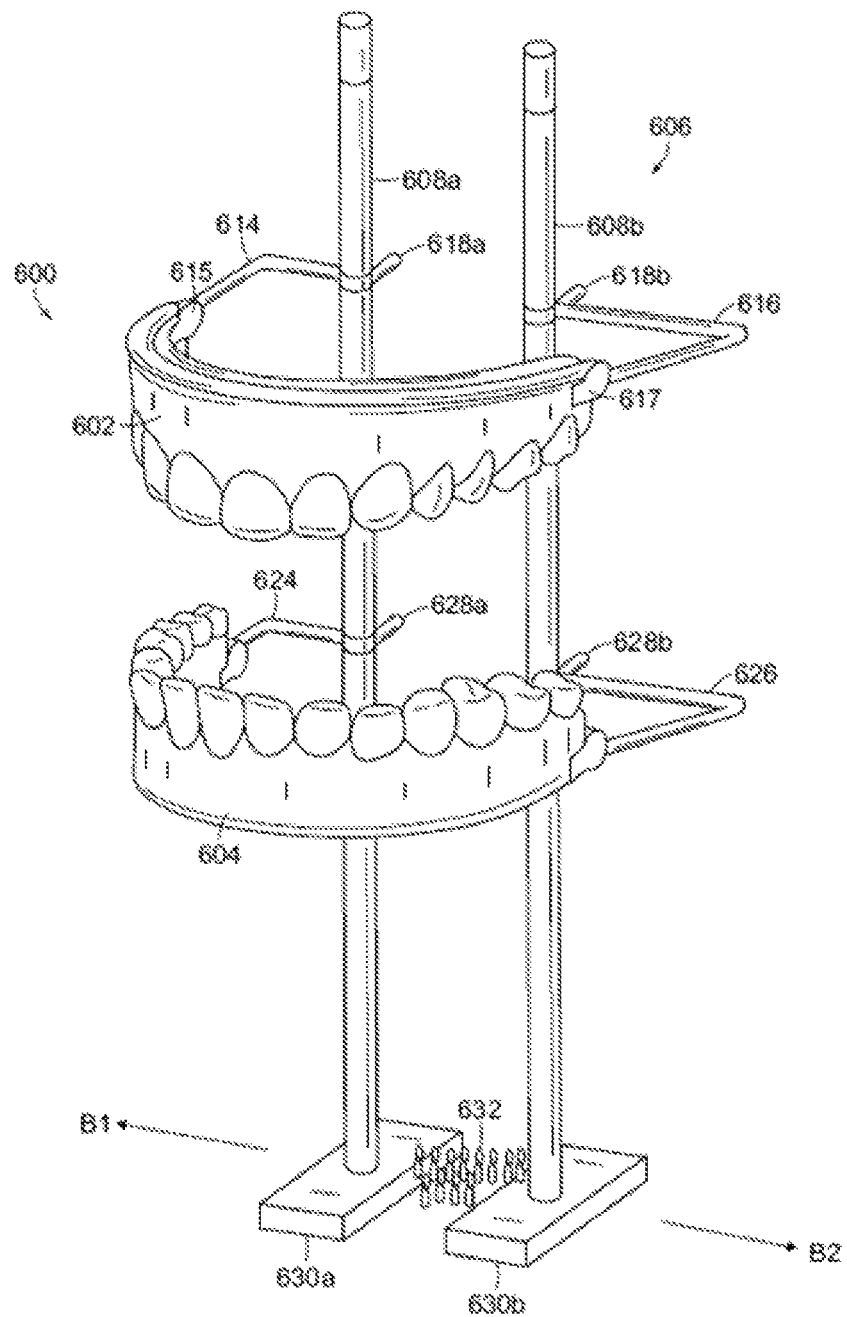
FIG. 6 is a schematic representation of another embodiment of a holder having a dental model mounted thereon.

FIG. 6 is a schematic representation of another embodiment of a holder 606 configured to have a dental model 600 having upper and lower jaws 602, 604 mounted thereon. The holder 606 can include first and second elongate shafts 608a, 608b that can extend substantially parallel to one another and that can be moveable with respect to each other. In the illustrated embodiment, the first and second elongate shafts 608a, 608b can each extend from a respective support member or base members 630a, 630b. The shafts 608a, 608b can be formed separately from or integrally with the base members 630a, 630b.

As shown in FIG. 6, the holder 606 can include an extendable connector 632 extending between the base members 630a, 630b. Thus, the base members 630a, 630b can be brought closer to each other or moved away from each other (e.g., in opposite directions B1 and B2) while they remain coupled to one another via the connector 632. In this way, the first and second elongate shafts 608a, 608b can be moved with respect to each other to thus cause the upper and lower jaws 602, 604 to deform, for example, to adopt a flattened configuration.

As shown in FIG. 6, the upper jaw 602 can be coupled to the first shaft 608a via an extendable arm 614 and it can be coupled to the second shaft 608b via an extendable arm 616. Similarly, the lower jaw 604 can be coupled to the first shaft 608a via an extendable arm 624 and it can be coupled to the second shaft 608b via an extendable arm 626. The extendable arms 614, 616 can be coupled to the first and second shafts 608a, 608b via coupling mechanisms 618a, 618b, and the extendable arms 624, 626 can be coupled to the first and second shafts 608a, 608b via coupling mechanisms 628a, 628b. The coupling mechanisms 618a, 618b, 628a, 628b can be any suitable mechanisms that can change their position along the shafts 608a, 608b. The arms 614, 616, 624, 628 can be similar to arms 514, 516, 524, 528 of holder 506 (FIG. 5).

The upper and lower jaws 602, 604 can be removably mounted on the holder 606. As shown in FIG. 6, the upper jaw 602 can be mounted on the arms 614, 616 via respective engaging or clasping mechanisms 615, 617. In the illustrated embodiment, the clasping mechanisms 615, 617 are permanently coupled to the arms 614, 616 and the upper jaw 602 can be clasped to the arms 614, 616 via the clasping mechanisms 615, 617. However, in some embodiments, opposite ends of the upper jaw 602 can have clasping or other mechanisms each configured to couple to a respective arm. The lower jaw 604 can be similarly mounted to the arms 624, 626.

As shown in FIG. 6, the first and second shafts 608a, 608b do not obstruct a user's view of the back of the artificial jaws 602, 604. Thus, the upper and lower jaws 602, 604 can be viewed from any side when mounted on the holder 606. The holder 606 can be operated to position the upper and lower jaws 602, 604 with respect to each other in a desired manner and to deform the upper and lower jaws 602, 604 as desired. It should be appreciated that only one of the upper and lower jaws 602, 604 can be mounted on the holder 606.

Regardless of the specific implementation of an artificial jaw in accordance with some embodiments and the way in which the jaw can be mounted on a holder, the artificial jaw can demonstrate the dental arch configuration in relation to the peripheral structures, such as the palate, nasal floor, and soft palate which all connects to the pharyngeal cavity. The dental model can be utilized to manufacture commercial and custom sports, mouth, and oral pieces.

In some embodiments, a suitable computing system can be used to generate a dental model which is then used to manufacture the artificial jaw. The dental model can be generated in accordance with the Dentometrics™ theory and analysis developed by the applicant. The Dentometrics™ theory states that the dental arch is composed with an internal geometric pattern configured by the dental bone and an external arch form configured by teeth. The geometric configuration of the internal pattern modulates the labial outline of the dental alignment and occlusion. In other words, teeth are erupted into an arch form, such that they are pushed and shifted into malposition and malocclusion by a deformed arch. Thus, the dental model can demonstrate the geometric configuration of the internal pattern thus demonstrating the morphologic variation of the arch form and its effects on dental alignments and occlusion.

Figure 7A:
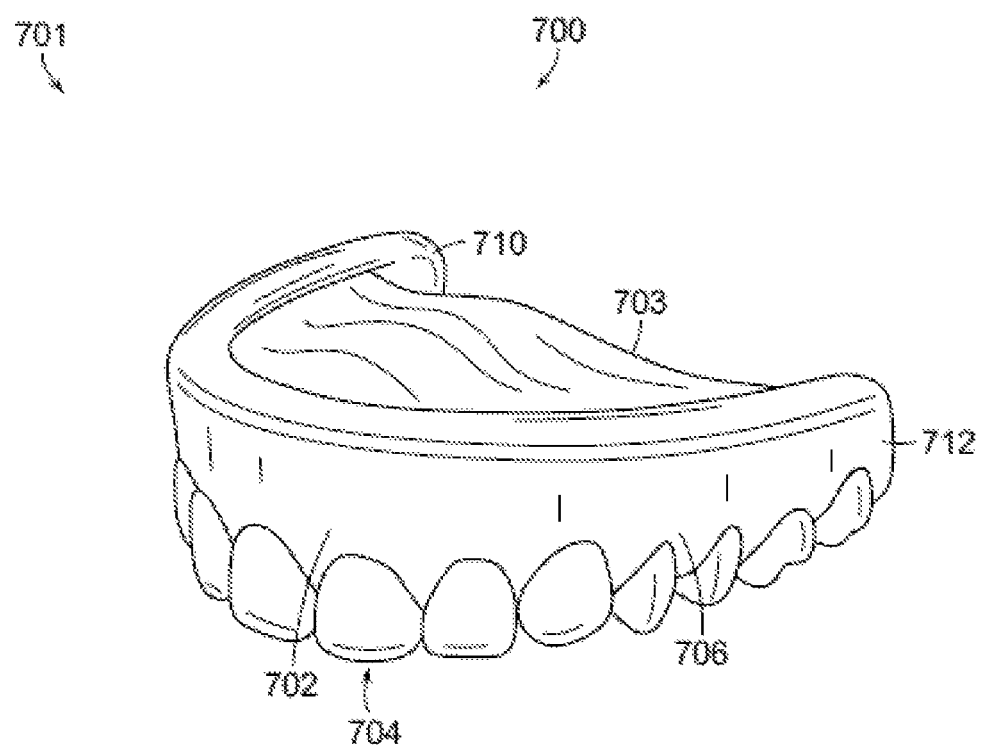
FIG. 7A is a perspective view of one embodiment of an artificial jaw, showing a hard palate in an original configuration.
Figure 7B:
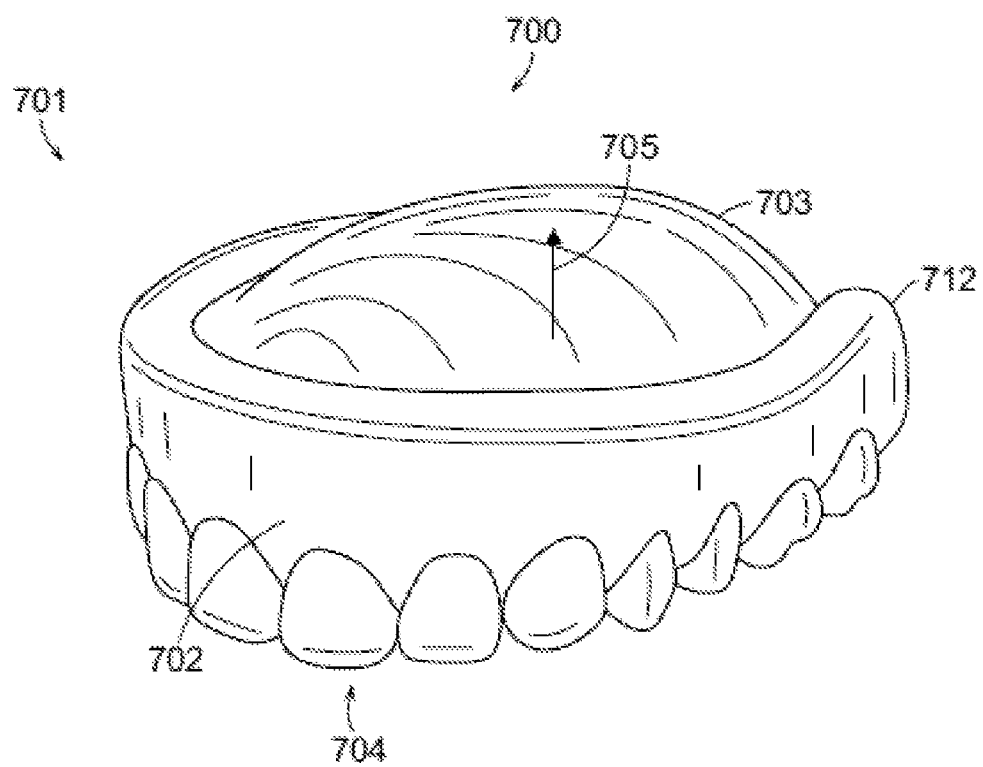
FIG. 7B is a perspective view of the artificial jaw of FIG. 7A, showing the hard palate in a deformed configuration.

FIGS. 7A and 7B illustrate one embodiment of a dental model 701 including an artificial jaw 700 and an artificial hard palate 703. The artificial hard palate, which also serves as the floor of the nasal cavity, can be configured to demonstrate a deformation of a natural hard palate that can occur in response to a deformation of the dental arch.

As shown, the artificial jaw 700 can include a base portion 702 and a plurality of teeth 704. In the illustrated embodiment, the jaw 700 is in the form of an upper jaw, and the teeth 704 represent maxillary teeth. The base portion 702 can have an outer wall 706 and an inner wall (not shown) extending between first and second ends or end portions 710, 712 of the base portion 702. Similar to artificial jaw 100 (FIGS. 1, 2, 3A, and 3B), the artificial jaw 700 is a flexible, extendable jaw.

The artificial hard palate 703 can be formed integrally and/or monolithically with the base portion 702. Alternatively, the hard palate 703 can be removably coupled to the base portion 702 in a suitable manner. For example, an inner surface of the base portion 702 can have a recess (not shown) configured to slidably receive therein the hard palate 703. Other features can also be used to removably couple the hard palate 703 to the base portion 702.

The hard palate 703 can be configured to represent a natural hard palate located in the roof of the mouth of a subject (e.g., a human) and serves as the floor of the nasal cavity. Thus, the hard palate 703 can include ridges and other features of a natural hard palate. It should be appreciated, however, that the hard palate 703 of the dental model 701 can be a simplified representation of a natural hard palate such that some features of the hard palate 703 are for demonstration purposes only. Thus, although the natural hard palate is a bony structure, in the illustrated embodiment, the hard palate 703 is formed from an elastic and resilient material such that it can bend or deform in any other manner. The material can be, for example, natural or synthetic rubber or any other suitable polymer.

FIG. 7A shows the dental arch formed by the base portion 702 and the teeth 704 is an original, undeformed configuration. In such configuration, the hard palate 703 in also in an original, undeformed configuration. However, when the base portion 702 is deformed, this will cause the hard palate 703 to also deform. For example, as shown in FIG. 7B, by causing a distance between the first and second end portions 710, 712 along the dental arch to decrease (e.g., by squeezing the flexible base portion 702), the hard palate 703 can deform by arching outwardly, as indicated by an arrow 705. As shown in FIG. 7B, the hard palate 703 can bulge outwardly such that the roof of the mouth that the palate 703 represents deforms as the left and right sides of the dental arch are brought closer together. In this way, it can be demonstrated that a deformation of the dental arch formed by the base portion 702 and the teeth 704 causes a deformation of the hard palate 703, and vice versa. The dental model 701 can thus be used to demonstrate variations in the shape of the dental arch and how such variations affect not only dental alignments and occlusion, but also the nasal airway via deformed palate. The dental model 701 can be configured such that, as the base portion 702 is deformed, one or more of the teeth 704 can move to malocclusion, thus affecting breathing.

The dental model 701 can be configured such can the base portion 702 carrying the teeth 704 can be deformed in various ways which will cause different types of deformation of the hard palate 703.

In some embodiments, a dental model of a dental arch can include features representing both hard palate (the front part of the roof of the mouth) and a soft palate (soft tissue constituting the back of the roof of the mouth) connected to uvula. The dental model can be configured such that a deformation of the dental arch will cause a deformation of both the hard and soft palate and a change in the position of the uvula further towards the back of the throat.

Figure 8A:
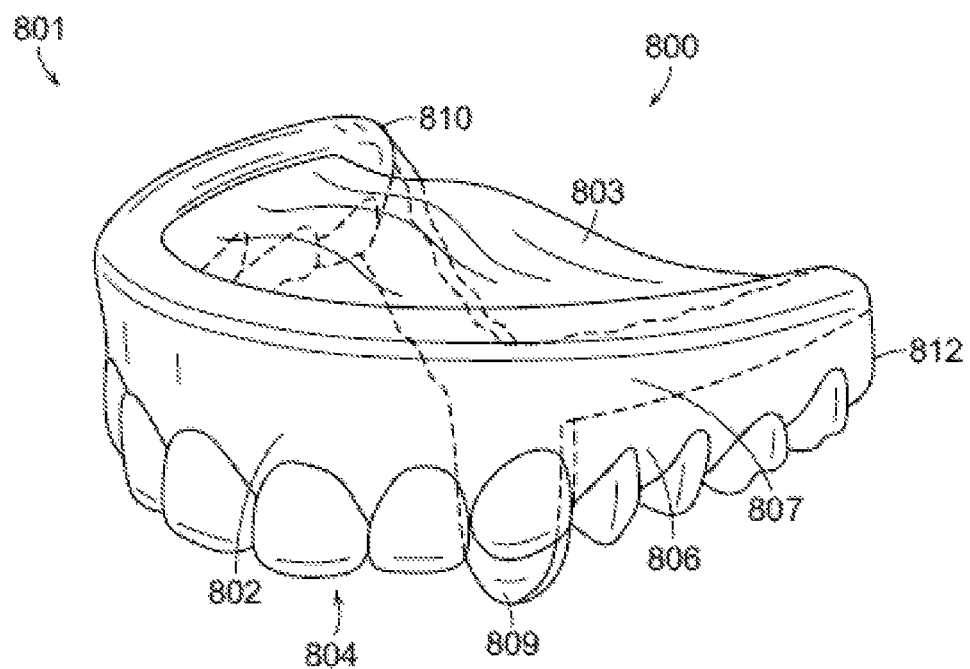
FIG. 8A is a perspective view of one embodiment of an artificial jaw, showing a hard palate, a soft palate, and uvula in an original configuration.
Figure 8B:
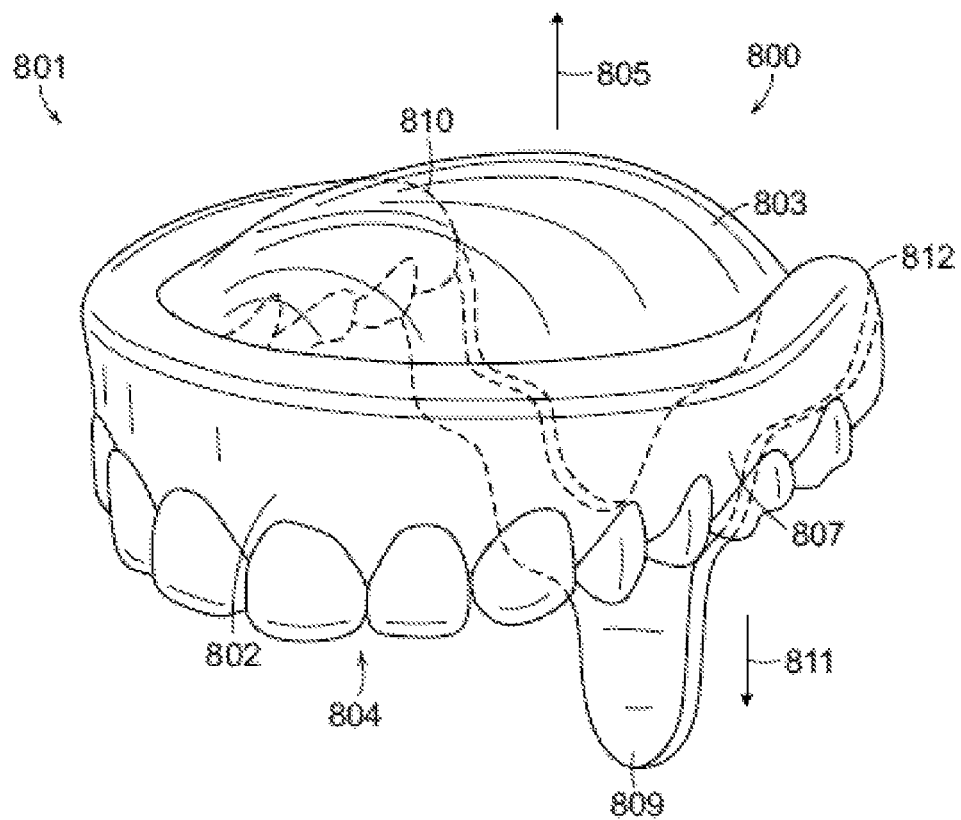
FIG. 8B is a perspective view of the artificial jaw of FIG. 8A, showing the hard palate a soft palate, and uvula in a deformed configuration.

FIGS. 8A and 8B show a dental model 801 of an artificial jaw 800 including a base portion 802 and a plurality of teeth 804. Similar to dental model 701 (FIG. 7), the artificial jaw 800 represents an upper jaw, and the teeth 804 represent maxillary teeth. The base portion 802 can have an outer wall 806 and an inner wall (not shown) extending between first and second ends or end portions 810, 812 of the base portion 802. Similar to artificial jaw 100 (FIGS. 1, 2, 3A, and 3B) and artificial jaw 700 (FIG. 7), the artificial jaw 800 is a flexible, extendable jaw.

As shown in FIGS. 8A and 8B, the dental model 801 includes a hard palate 803 and a soft palate 807 with an uvula 809 extending therefrom. The hard palate 803 can be similar to hard palate 703 shown in FIG. 7. The soft palate 807, which is partially obscured in FIGS. 8A and 8B, is configured to represent a natural soft palate. The hard and soft palates 803, 807 can have dimensions and shape that mimic respective dimensions and shape of natural hard and soft palates of a subject. However, the hard and soft palates 803, 807, as well as other parts of the dental model 801, can have any suitable dimensions and shape.

One or both of the hard and soft palates 803, 807 can be integrally and/or monolithically formed with the base portion 802. Alternatively, one or both of the hard and soft palates 803, 807 can be formed separately from the base portion 802. In some embodiments, the one or both of the hard and soft palates 803, 807 can be removably coupled to the base portion 802 in a suitable manner.

The hard palate 803 can be formed from materials similar to those used to form hard palate 703 (FIG. 7). The soft palate 807 can also formed from a natural or synthetic rubber, or from any other suitable material. In some embodiments, because the soft palate 807 represents a soft tissue, it can be formed from one or more materials (e.g., natural or synthetic fabric) that are more flexible than material(s) used to form the hard palate 803. However, a person skilled in the art will appreciate that any suitable materials can be used to form the hard and soft palates 803, 807.

As shown in FIG. 8A, in the original, undeformed configuration of the dental arch, the hard and soft palates 803, 807 remain in the original, undeformed configuration. When the dental arch is manipulated to cause it to deform, the deformation of the dental arch can cause the hard and soft palates 803, 807 to deform as well. In the illustrated embodiment, as shown in FIG. 8B, when the first and second end portions 810, 812 of the base portion 802 are brought closer together such that a distance therebetween decreases such that the base portion 802 and teeth 804 forming the dental arch deform, the hard palate 803 can arch outwardly (shown by an arrow 805) and the soft palate 807 can extend in the opposite direction shown by an arrow 811. This can demonstrate that a deformation of the dental arch causes the hard and soft palates to deform, and vice versa. The dental model 801 can be configured such can the base portion 802 carrying the teeth 804 can be deformed in various ways which will cause different types of deformations of the hard and soft palates 803, 807, which can illustrate various dysfunctions involving oral- and nasal-pharyngeal space.

The dental models 701, 801 can be mounted on any suitable holder that can be configured to hold the dental models in a manner that allows manipulating (e.g., deforming) the models to show respective deformations of one or both of the soft and hard palate. For example, support holders 506 (FIG. 5) and 606 (FIG. 6), or any other holders, can be used. The holder can allow articulating the dental models 701, 801 in any desired manner.

One skilled in the art will appreciate further features and advantages of the invention based on the above-described embodiments. Accordingly, the invention is not to be limited by what has been particularly shown and described, except as indicated by the appended claims.

What is claimed is:

1. A dental model comprising:
at least one artificial jaw including:
a plurality of teeth; and
a base portion retaining the plurality of teeth, the base portion having opposite first and second ends configured to move relative to each other in three dimensions, wherein inner and outer walls of the base portion extending between the first and second ends are arch-shaped, and wherein a contour of the inner wall follows an internal arch pattern and a contour of the outer wall follows an outline of the plurality of teeth; and
a holder having first and second arms coupled thereto, wherein the at least one artificial jaw is configured to be mounted on the holder via the first and second arms.

2. The dental model of claim 1, wherein the plurality of teeth and the base portion form a dental arch.

3. The dental model of claim 1, wherein the plurality of teeth represent natural teeth of a subject.

4. The dental model of claim 1, wherein:
in a first configuration of the base portion, the first and second ends are disposed in the same plane; and
the base portion is configured to move from the first configuration to the second configuration in which the first and second ends are disposed in different planes.

5. The dental model of claim 4, wherein, in the second configuration, a plane extending through the first end is disposed at an angle greater than about 5 degrees relative to a plane extending through the second end.

6. The dental model of claim 1, wherein:
in a first configuration of the base portion, the outer and inner walls are arch-shaped; and
the base portion is configured to move from the first configuration to a second configuration in which the inner and outer walls extend substantially along a same axis extending therethrough, the axis extending between the first and second ends.

7. The dental model of claim 1, wherein at least one of the base portion and the plurality of teeth are formed from an elastic and flexible material.

8. The dental model of claim 1, wherein the base portion is at least partially transparent.

9. The dental model of claim 1, wherein one or more of the plurality of teeth are removable from the base portion.

10. The dental model of claim 1, wherein one or more of segments of the base portion each including a portion of the base portion and at least one tooth of the plurality of teeth supported by the portion are removable from the base portion.

11. The dental model of claim 1, wherein the at least one jaw comprises an upper jaw.

12. The dental model of claim 11, further comprising:
a hard palate configured such that a deformation of the base portion causes the hard palate to deform; and
a soft palate configured such that a deformation of the base portion causes the soft palate to deform and to change a pharyngeal spatial configuration.

13. The dental model of claim 1, wherein first and second arms of the holder are extendable and are hingeably coupled thereto.

14. The dental model of claim 13, wherein the first and second arms are hingeably coupled to different locations along a longitudinal axis of the holder.

15. The dental model of claim 13, wherein the holder has first and second elongate shafts, each first and second elongate shaft having corresponding first and second arms hingeably coupled thereto,
wherein the at least one artificial jaw comprises an upper jaw and a lower jaw; and
wherein the upper and lower jaws are each mounted on the holder via the first arms coupled to first and second ends, respectively, of the upper jaw and the second arms coupled to first and second ends, respectively, of the lower jaw.

16. The dental model of claim 13, wherein the at least one artificial jaw is mounted on the holder via the first arm coupled to the first end of the base portion and the second arm coupled to the second end of the base portion.

17. A method of manufacturing a dental model, the method comprising:
forming a dental arch having a plurality of teeth and a base portion holding the plurality of teeth, the base portion having opposite first and second ends being formed to be movable relative to each other in three dimensions, inner and outer walls of the base portion extending between the first and second ends are arch-shaped in a first configuration, a contour of the inner wall following an internal arch pattern, a contour of the outer wall following an outline of the plurality of teeth, the base portion being formed to be movable from the first configuration to a second configuration in which the inner and outer walls extend substantially along a same axis extending therethrough, the same axis extending between the first and second ends.

18. The method of claim 17, wherein the dental arch has hard and soft palates, the hard palate being formed to deform in a first direction, and the soft palate being formed to extend in a second, opposite direction to the first direction.

19. The method of claim 17, further comprising forming a holder having an elongate shaft and first and second extendable arms hingeably coupled thereto, wherein the at least one dental arch is formed to be mounted on the holder via the first extendable arm being formed to be coupled to the first end of the base portion and the second extendable arm being formed to be coupled to the second end of the base portion.

* * * * *